US008533331B1

(12) United States Patent
Thaker et al.

(10) Patent No.: US 8,533,331 B1
(45) Date of Patent: Sep. 10, 2013

(54) METHOD AND APPARATUS FOR PREVENTING CONCURRENCY VIOLATION AMONG RESOURCES

(75) Inventors: Bhavin Thaker, Sunnyvale, CA (US); Yuh-Yen Yen, San Jose, CA (US); Carlos Wong, Castro Valley, CA (US)

(73) Assignee: Symantec Corporation, Mountain View, CA (US)

( * ) Notice: Subject to any disclaimer, the term of this patent is extended or adjusted under 35 U.S.C. 154(b) by 1209 days.

(21) Appl. No.: 11/702,450

(22) Filed: Feb. 5, 2007

(51) Int. Cl.
*G06F 11/00* (2006.01)

(52) U.S. Cl.
USPC .......................................... 709/226; 709/229

(58) Field of Classification Search
USPC ................. 709/223–226, 204–207, 217–219, 709/229
See application file for complete search history.

(56) References Cited

U.S. PATENT DOCUMENTS

| 5,117,352 | A * | 5/1992 | Falek | 714/4 |
| 7,058,846 | B1 * | 6/2006 | Kelkar et al. | 714/4 |
| 2004/0221079 | A1 * | 11/2004 | Goldick | 710/200 |
| 2005/0021751 | A1 * | 1/2005 | Block et al. | 709/225 |

OTHER PUBLICATIONS

Tal Garfinkel, "Traps and Pitfalls: Practical Problems in System Call Interposition Based Security Tools", Proceedings of the Network and Distributed Systems Security Symposium 2003, Sections I, III.*
Garfinkel, Tal, "Traps and Pitfalls: Practical Problems in System Call Interposition Based Security Tools," The 10th Annual Network and Distributed System Security Symposium, San Diego, California, Feb. 6-7, 2003.
Puschitz, Werner, "Securing and Hardening Red Hat Linux Production Systems—A Practical Guide to Basic Linux Security in Production Enterprise Environments," downloaded from web site http://www.puschitz.com/SecuringLinux.shtml on Dec. 28, 2007.

* cited by examiner

*Primary Examiner* — Thai Nguyen
(74) *Attorney, Agent, or Firm* — Campbell Stephenson LLP

(57) ABSTRACT

Method and apparatus for preventing concurrency violations among resources in a clustered computer system is described. In one example, a system call is intercepted at a node in the clustered computer system. The system call identifies a target resource. An assigned state of the target resource with respect to the node is determined. The system call is handled at the node based on the assigned state. For example, the system call may be intended to bring the target resource online. The system call is handled by failing the system call at the node if the assigned state indicates that the target resource should be offline at the node. The target resource is allowed to be brought online if the assigned state indicates that the target resource can be online.

10 Claims, 3 Drawing Sheets

METHOD AND APPARATUS FOR PREVENTING CONCURRENCY VIOLATION AMONG RESOURCES

BACKGROUND OF THE INVENTION

1. Field of the Invention

Embodiments of the invention generally relate to redundant computer systems. More specifically, this disclosure relates to a method and apparatus for preventing concurrency violations among resources in redundant computer systems, such as, in clustered computer systems.

2. Description of the Related Art

Computer systems and their components are subject to various failures. These failures are generally related to devices, resources, applications, or the like. Many different approaches to fault-tolerant computing are known in the art. Fault tolerance is the ability of a system to continue to perform its functions, even when one or more components of the system have failed. Fault-tolerant computing is typically based on replication of components (i.e., redundancy) and ensuring for equivalent operation between the components. Fault-tolerant systems are typically implemented by replicating hardware and/or software (generally referred to as resources), such as providing pairs of servers, one primary and one secondary. Such a redundant system is often referred to as a server cluster, clustered computer system, clustered environment, or the like. A server in a clustered environment is generally referred to as a node or cluster node. The failover of resources in the clustered system is handled by clustering software that is distributed among the cluster nodes.

In a clustered environment, a resource should be active (referred to as "online") on only one of the cluster nodes. To be aware of the resource state on all the cluster nodes, the clustering software periodically performs offline monitoring of the resources on the cluster nodes where such resources are supposed to be offline. If the clustering software finds a resource to be online when such resource should be offline (due to, accidental or manual start of the resource by a user), the clustering software deactivates the resource (takes the resource offline). A resource that is online on more than one cluster node results in a "concurrency violation."

Conventionally, clustering software periodically polls for concurrency violations at particular intervals. Such an approach, however, delays response to concurrency violations. For example, if a resource is accidentally started by the user without using the clustering software, then the clustering software may take a few minutes to detect, report, and act on the concurrency violation. In this time interval, there is a risk of data corruption on the cluster nodes due to the resource being online concurrently on more than one node. Accordingly, there exists a need in the art for a method and apparatus for handling concurrency violations, for example, in a clustered environment.

SUMMARY OF THE INVENTION

Method and apparatus for preventing concurrency violations among resources in a clustered computer system is described. In one embodiment, a system call is intercepted at a node in the clustered computer system. The system call is intended to bring online a target resource. An assigned state of the target resource with respect to the node is determined. The system call is handled at the node based on the assigned state. The system call is handled by failing the system call at the node if the assigned state indicates that the target resource should be offline at the node. The target resource is allowed to be brought online if the assigned state indicates that the target resource can be online.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
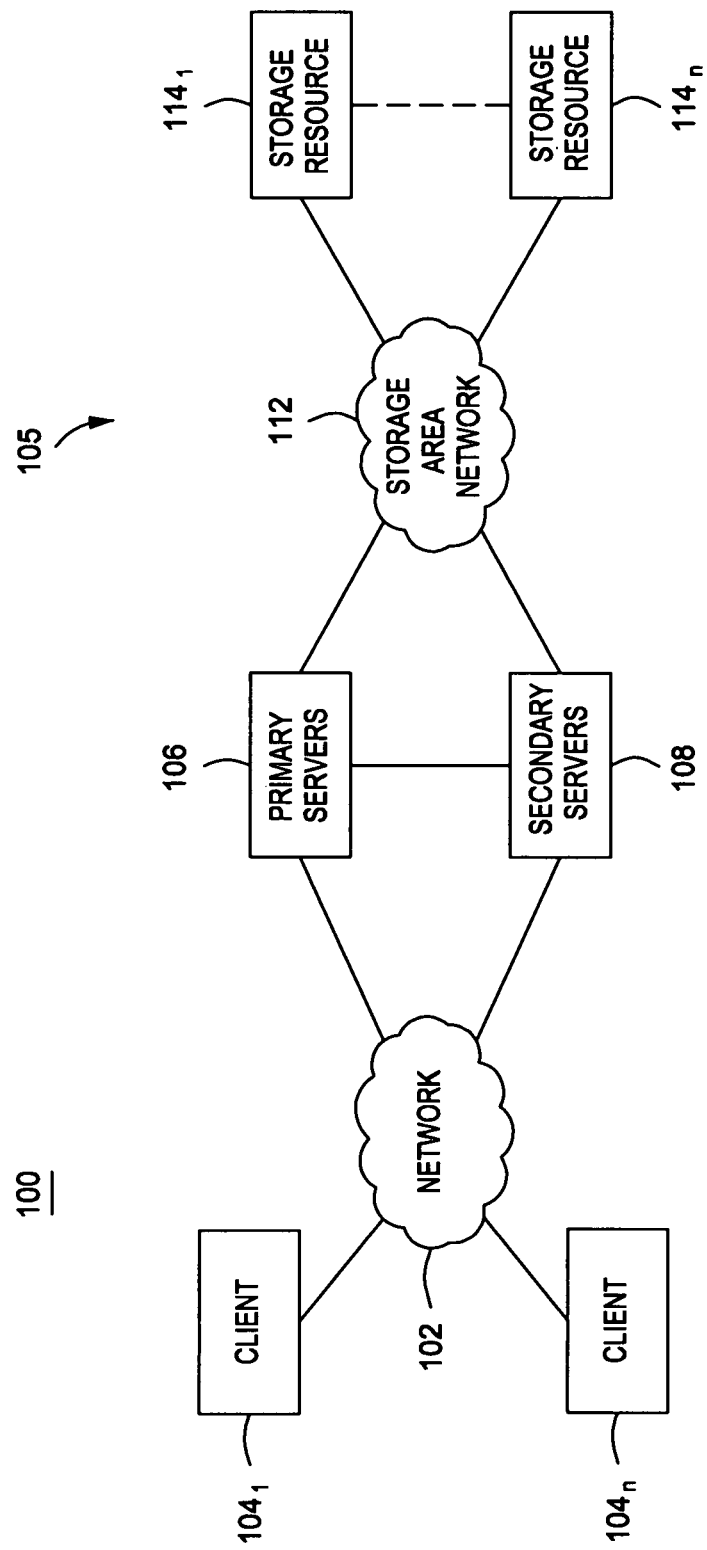
FIG. 1 is a block diagram depicting an exemplary embodiment of a networked computer system in accordance with one or more aspects of the invention.

FIG. 1 is a block diagram depicting an exemplary embodiment of a networked computer system 100 in accordance with one or more aspects of the invention. The system 100 includes a network 102, clients $104_1$-$104_n$, a server cluster 105, a network 112, and storage volumes $114_1$-$114_n$. In the present example, the server cluster 105 includes primary servers 106 and secondary servers 108. By "primary" it is meant that the servers 106 nominally provide resources for use by the clients $104_1$-$104_n$. By "secondary" it is meant that the servers 108 provide redundant or failover resources for the resources of the primary servers 106. Thus, the secondary servers 108 provide resources to the clients 104 only to the extent such resources on the primary server 106 fail. The servers 106 and 108 may also be generally referred to herein as computer systems or nodes in the server cluster 105.

The clients $104_1$-$104_n$ are configured for communication with the server cluster 105 via the network 102. The network 102 comprises a communication system that connects computer systems by wire, cable, fiber optic, and/or wireless links facilitated by various types of well-known network elements, such as hubs, switches, routers, and the like. The network 102 may employ various well-known protocols to communicate information. The clients $104_1$-$104_n$ may comprise various types of computers, such as laptops, desktop computers, workstations, and the like. The primary servers 106 and the secondary servers 108 provide resources for the clients $104_1$-$104_n$. For example, the primary servers 106 and secondary servers 108 may include file servers, e-mail servers, terminal servers, and/or the like. The primary servers 106 and the secondary servers 108 may be implemented using any type of computer systems capable of hosting resources for the clients $104_1$-$104_n$.

The primary servers 106, the secondary servers 108, and the storage volumes $114_1$-$114_n$ are coupled to the network 112. The network 112 may comprise, for example, a storage area network (SAN). The storage volumes $114_1$-$114_n$ may comprise any type of block-based storage areas and may be implemented using any type of storage system or storage systems, such as a disk drive system. A disk drive system may include, for example, one or more storage disks, e.g., an array of storage disks or redundant array of storage disks. The storage volumes $114_1$-$114_n$ store data, such as application programs and program data created and managed by the primary servers 106 and secondary server 108. The stored data are organized into file systems. A file system refers to the structure and arrangement of files in a storage device. For example, a file system typically includes a hierarchy of directories, each of which may contain one or more files.

Figure 2:
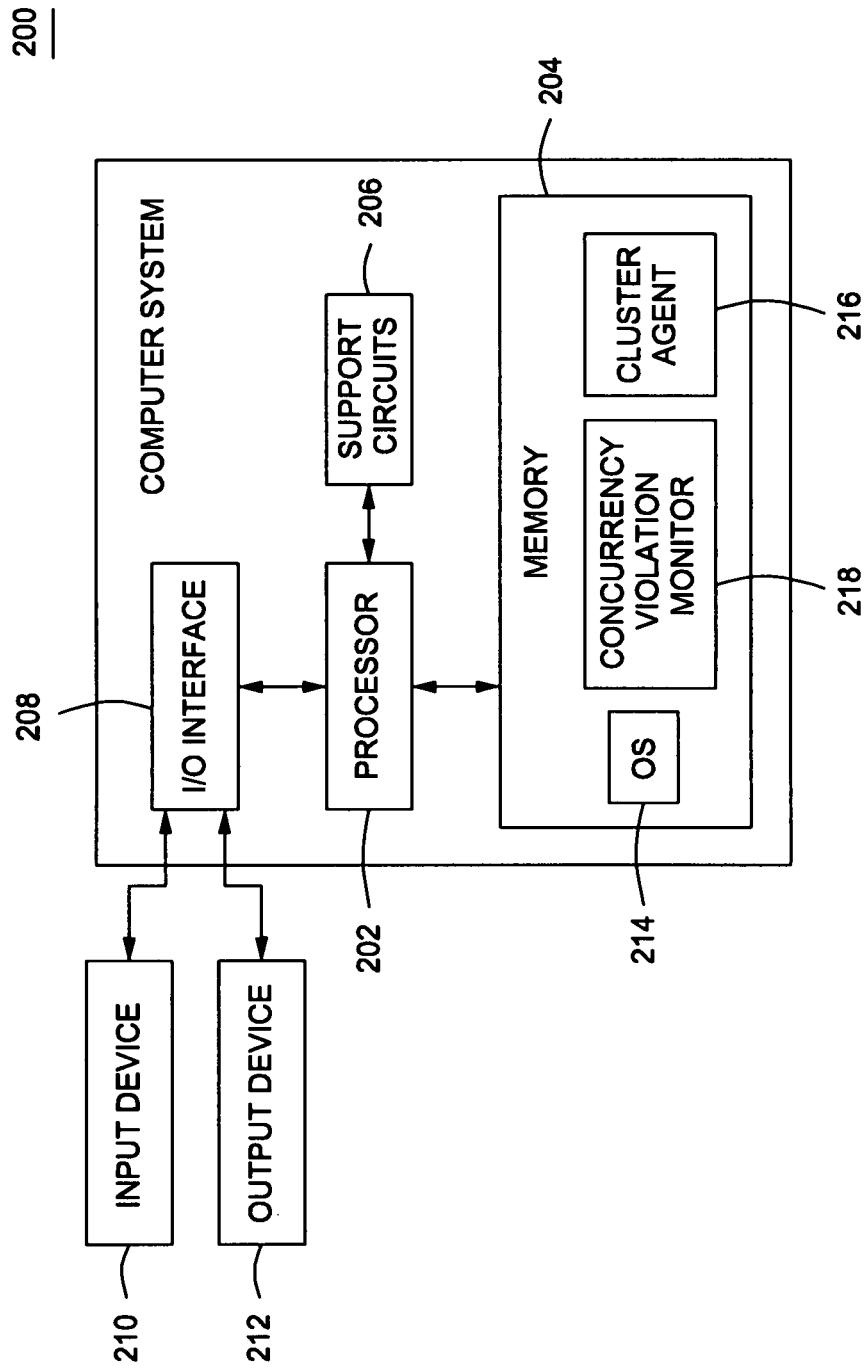
FIG. 2 is a block diagram depicting an exemplary embodiment of a computer system in accordance with one or more aspects of the invention.

FIG. 2 is a block diagram depicting an exemplary embodiment of a computer system 200 in accordance with one or more aspects of the invention. The computer system 200 may be used to implement one or more of the primary servers 106 and/or secondary servers 108 (shown in FIG. 1). The computer system 200 includes a processor 202, a memory 204, various support circuits 206, and an I/O interface 208. The processor 202 may include one or more microprocessors known in the art. The support circuits 206 for the processor 202 include conventional cache, power supplies, clock circuits, data registers, I/O interfaces 208, and the like. The I/O interface 208 may be directly coupled to the memory 204 or coupled through the processor 202. The I/O interface 208 may also be configured for communication with input devices 210 and/or output devices 212, such as, network devices, various storage devices, mouse, keyboard, display, and the like.

The memory 204 stores processor-executable instructions and/or data that may be executed by and/or used by the processor 202. These processor-executable instructions may comprise hardware, firmware, software, and the like, or some combination thereof. Modules having processor-executable instructions that are stored in the memory 204 may include a cluster agent 216 and a concurrency violation monitor 218. The computer system 200 may be programmed with one or more operating systems (generally referred to as operating system (OS) 214), which may include OS/2, Java Virtual Machine, Linux, Solaris, Unix, HPUX, AIX, Windows, Windows95, Windows98, Windows NT, and Windows2000, WindowsME, WindowsXP, Windows Server, among other known platforms. At least a portion of the operating system 214 may be disposed in the memory 204. The memory 204 may include one or more of the following random access memory, read only memory, magneto-resistive read/write memory, optical read/write memory, cache memory, magnetic read/write memory, and the like, as well as signal-bearing media as described below.

The operating system 214 is configured to manage various resources. A "resource" may include any type of hardware or software resource, such as a disk resource, a network resource, a process resource, or the like. A disk resource includes any type of file system, volume, disk group, or the like. A network resource includes any type of socket or the like for communicating data using a protocol, such as Internet Protocol (IP) and the like. A process resource includes any process, thread, application, or the like executing on the processor 202. The cluster agent 216 is part of clustering software that manages the server cluster 105. The cluster agent 216 is configured to control failover of resources from one or more computers in the cluster to the computer system 200, or from the computer 200 to one or more other computers in the cluster. The cluster agent 216 tracks the status of the resources managed by the operating system 214, including the assigned status of the resources. The assigned status of a resource indicates whether or not such resource can be online or should be offline at the computer system 200. As described above, a resource should be offline at a given node if the resource is online at another node. If a resource is not online on any other node, then the resource can be online on the computer system 200.

Notably, the cluster agent 216 is aware that a particular resource is online on another computer system in the cluster 105 and thus should be offline on the computer system 200. The concurrency violation monitor 218 is configured to interact with the operating system 214 and the cluster agent 216 to detect and prevent concurrency violations on the computer system 200. Although the concurrency violation monitor 218 is shown separately from the cluster agent 216, those skilled in the art will appreciate that the concurrency violation monitor 218 may be incorporated as part of the cluster agent 216. That is, the function performed by the concurrency violation monitor 218 as discussed below may be performed by the cluster agent 216.

Figure 3:
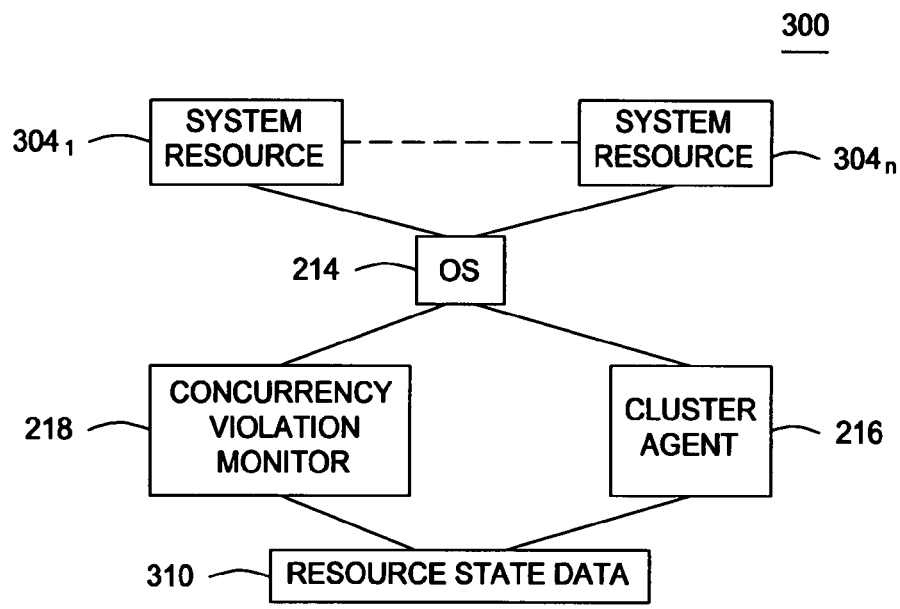
FIG. 3 is a block diagram depicting an exemplary embodiment of a system for preventing concurrency violations in accordance with one or more aspects of the invention.

In particular, FIG. 3 is a block diagram depicting an exemplary embodiment of a system 300 for preventing concurrency violations in accordance with one or more aspects of the invention. The system 300 includes the operating system 214, the cluster agent 216, and the concurrency violation monitor 218. The operating system 214 is configured to manage resources $304_1$-$304_n$. The resources $304_1$-$304_n$ are also capable of being managed by one or more other computers systems in the cluster 105 for redundancy. The cluster agent 216 is configured to maintain resource state data 310. The resource state data 310 includes the assigned status of the resources $304_1$-$304_n$ with respect to the computer system 200, such status being indicative of whether each of the resources $304_1$-$304_n$ should be online or offline at the computer system 200. For example, if the cluster agent 216 is aware that the resource $304_1$ is online on another server in the cluster, the cluster agent 216 configures the resource state data 310 to indicate that the resource $304_1$ should be offline at the computer system 200. If the cluster agent 216 is aware that the resource $304_1$ is not online on any other server in the cluster, the cluster agent 216 configures the resource state data 310 to indicate that the resource $304_1$ can be online at the computer system 200.

The concurrency violation monitor 218 is configured to interface with the operating system 214 and to access the resource state data 310. The concurrency violation monitor 218 is configured to trap system calls to the operating system 214 to bring resources online ("target system calls"). A system call is an instruction to the operating system 214 to bring online or otherwise activate a particular resource. A system call may be implemented as a primitive of the operating system. For example, some operating systems support a mount( ) system call or family of system calls for bringing a disk resource online. Some operating systems support an exec( ) system call or family of system calls for bringing a process resource online. Such system calls are merely exemplary. Those skilled in the art appreciate that any given operating system includes various system calls for bringing various types of resources online or otherwise activating various types of resources.

The concurrency violation monitor 218 traps the target system calls by intercepting them before they cause the operating system 214 to bring the target resources online. In one embodiment, the concurrency violation monitor 218 registers with the operating system 214 such that the operating system 214 is aware of which system calls are to be trapped. For example, the concurrency violation monitor 218 may register callback procedures with the operating system 214 for the target system calls. When the operating system 214 receives one of the target system calls, the operating system 214 calls the appropriate callback procedure registered by the concurrency violation monitor 218, rather then perform the default processing for the system call (i.e., bring the target resource online).

When a particular system call is trapped, the concurrency violation monitor 218 identifies the target resource from the system call. Notably, system calls include various arguments required by the operating system 214 to bring the target resource online. Such arguments include the identity of the resource to be brought online. Thus, the concurrency violation monitor 218 can process these arguments to identify which one of the resources $304_1$-$304_n$ is the target. The concurrency violation monitor 218 then obtains the assigned status of the target resource at the computer system 200 from the resource state data 310. The assigned status is indicative of whether the target resource can be online or should be offline at the computer system 200. If the target resource can be online, the concurrency violation monitor 218 allows the system call to be successful. The operating system 214 is allowed to perform the default handling of the system call, i.e., the target resource is brought online.

If the target resource should be offline, the concurrency violation monitor 218 causes the system call to fail. Notably, the concurrency violation monitor 218 does not pass the system call back to the operating system 214 for default operating system. In this manner, the target resource is not brought online and no concurrency violation will occur. The concurrency violation monitor 218 may perform some processing while causing a system call to fail. For example, the concurrency violation monitor 218 may send a message to a log file or to a display screen indicating that the system call has failed in order to prevent a concurrency violation. In this manner, the concurrency violation monitor 218 is pro-active rather than reactive. That is, concurrency violations are prevented from happening at all, rather than letting concurrency violations happen and then acting on them.

Figure 4:
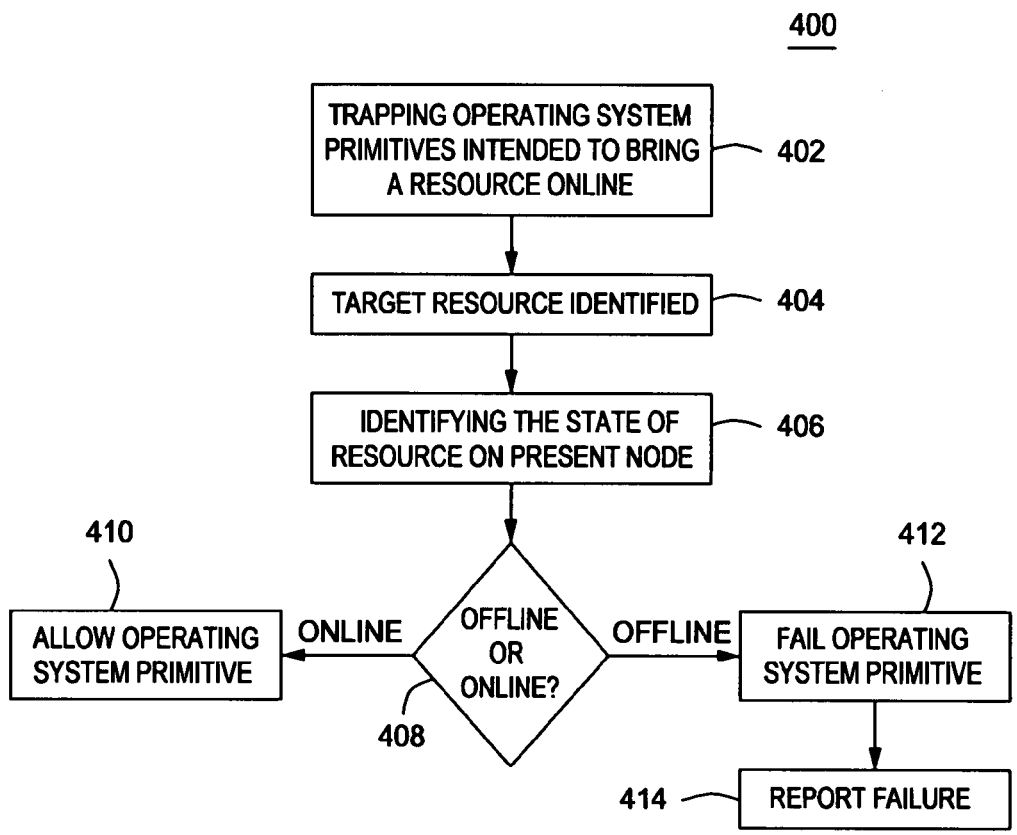
FIG. 4 is a flow diagram depicting an exemplary embodiment of a method for preventing concurrency violations in accordance with one or more aspects of the invention.

FIG. 4 is a flow diagram depicting an exemplary embodiment of a method 400 for preventing concurrency violations in accordance with one or more aspects of the invention. The method 400 begins at step 402, where a system call intended to bring a target resource online is trapped. At step 404, a target resource is identified from the system call. At step 406, a state of the target resource is obtained. As described above, the state of the target resource indicates whether the resource can be online or should be offline and is maintained by a cluster agent. At step 408, a determination is made whether the target resource can be online or should be offline as indicated by the state. If the target resource can be online, the method 400 proceeds to step 410. At step 410, the system call is allowed to be successful. That is, the operating system is allowed to handle the system call in a default manner. If the target resource should be offline, the method 400 proceeds instead to step 412. At step 412, the system call is failed. That is, the system call is not handled by the operating system in the default manner such that the target resource is not brought online. At step 414, the failure of the system call may be reported. For example, a message indicating the failure of the system call may be displayed on a screen or inserted into a log file.

Method and apparatus for preventing concurrency violations among redundant resources has been described. In one embodiment, clustering software in a cluster of servers is adapted to monitor for concurrency violations. On one or more servers, system calls to the operating system for bringing online (activating) resources are trapped. If the target resources can be online, then the system calls are allowed to be successful, i.e., the target resources are brought online. If the target resources should be offline due to such resources already being online on another server, the systems calls are failed such that the target resources are not brought online. In this manner, concurrency violations are not permitted to occur and are prevented. Since concurrency violations are prevented, possible data corruption may be avoided. This is an advantage compared to systems that address concurrency violations only after they have already occurred.

An aspect of the invention is implemented as a program product for use with a computer system. Program(s) of the program product defines functions of embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); and (ii) alterable information stored on writable storage media (e.g., floppy disks within a diskette drive or hard-disk drive or read/writable CD or read/writable DVD). Such computer readable media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

What is claimed is:

1. A method of preventing concurrency violations among resources in a clustered computer system, comprising:
   identifying a first subset of a plurality of system calls to an operating system, wherein the first subset of the plurality of system calls are configured to be intercepted, the first subset of the plurality of system calls comprises a first system call, and the identifying of the first subset is performed prior to intercepting the first system call;
   identifying a second subset of the plurality of system calls to the operating system, wherein
      the second subset of the plurality of system calls are not configured to be intercepted, and
      the identifying of the second subset is performed prior to intercepting the first system call;
   intercepting the first system call at a node in the clustered computer system, wherein
      the first system call is configured to make a target resource active at the node,
      the first system call is an operating system primitive to the operating system,
      the operating system is configured to execute on the node,
      the first system call comprises an instruction, and
      the target resource is active in another node in the clustered computer system;
   determining an assigned state of the target resource with respect to the node in response to intercepting the first system call;
   failing the first system call at the node if the assigned state indicates that the target resource is not permitted to be active at the node; and
   allowing the target resource to be active at the node if the assigned state indicates that the target resource is permitted to be active at the node.

2. The method of claim 1, wherein the first system call is intercepted from the operating system, and wherein the step of allowing comprises: returning the first system call to the operating system.

3. The method of claim 1, wherein the target resource is one of a disk resource, a network resource, and a process resource.

4. The method of claim 1, wherein the first system call includes at least one argument and the target resource is identified from the at least one argument.

5. The method of claim 1, wherein the assigned state of the target resource is for the target resource to be inactive if the target resource is active at any other node in the clustered computer system.

6. A system comprising:
a node in a clustered computer system embedded with a memory comprising:
an operating system configured to manage a plurality of resources, wherein the operating system is configured to execute on the node;
a cluster agent configured to maintain assigned state data for the plurality of resources; and
a concurrency violation monitor configured to:
identify a first subset of a plurality of system calls to the operating system, wherein
the first subset of the plurality of system calls are configured to be intercepted,
the first subset of the plurality of system calls comprises a first system call, and
the identifying of the first subset is performed prior to intercepting the first system call;
identify a second subset of the plurality of system calls to the operating system, wherein
the second subset of the plurality of system calls are not configured to be intercepted, and
the identifying of the second subset is performed prior to intercepting the first system call;
intercept the first system call to the operating system, wherein
the first system call is configured to make a target resource of the plurality of resources active at the node,
the first system call comprises operating system primitives comprising one or more instructions to the operating system executing on the node, and
the target resource is active in another node in the clustered computer system;
determine an assigned state for the target resource in response to intercepting the first system call;
fail the first system call at the node if the assigned state data of the target resource indicates that the target resource is not permitted to be active at the node; and
allow the target resource to be active if the assigned state thereof indicates that the target resource is permitted to be active at the node.

7. The node of claim 6, wherein the concurrency violation monitor is further configured to:
return the first system call to the operating system if the assigned state of the target resource indicates that the target resource is permitted to be active at the node.

8. The node of claim 6, wherein the target resource is one of a disk resource, a network resource, and a process resource.

9. The node of claim 6, wherein the first system call includes at least one argument and the target resource is identified from the at least one argument.

10. A non-transitory computer readable medium having instructions stored thereon that, when executed by a processor, cause the processor to perform a method of preventing concurrency violations among resources in a clustered computer system, comprising:
identifying a first subset of a plurality of system calls to an operating system, wherein the first subset of the plurality of system calls are configured to be intercepted, the first subset of the plurality of system calls comprises a first system call, and the identifying of the first subset is performed prior to intercepting the first system call;
identifying a second subset of the plurality of system calls to the operating system, wherein
the second subset of the plurality of system calls are not configured to be intercepted, and
the identifying of the second subset is performed prior to intercepting the first system call;
intercepting the first system call at a node in the clustered computer system, wherein
the first system call is configured to make a target resource active at the node,
the first system call is an operating system primitive to the operating system executing on the node,
the first system call comprises an instruction, and
the target resource is active in another node in the clustered computer system;
determining an assigned state of the target resource with respect to the node in response to intercepting the first system call;
failing the first system call at the node if the assigned state indicates that the target resource is not permitted to be active at the node; and
allowing the target resource to be active if the assigned state indicates that the target resource is permitted to be active at the node.

* * * * *